May 27, 1930. H. S. CHRISTOPHER Re. 17,675

MACHINE FOR TREATING PIPES AND THE LIKE

Original Filed Nov. 12, 1925 4 Sheets-Sheet 1

INVENTOR
HAROLD SERAPHIN CHRISTOPHER
BY Charles S. Evans
HIS ATTORNEY

May 27, 1930. H. S. CHRISTOPHER Re. 17,675

MACHINE FOR TREATING PIPES AND THE LIKE

Original Filed Nov. 12, 1925 4 Sheets-Sheet 2

INVENTOR
HAROLD SERAPHIN CHRISTOPHER
BY Charles S. Evans
HIS ATTORNEY

May 27, 1930. H. S. CHRISTOPHER Re. 17,675
MACHINE FOR TREATING PIPES AND THE LIKE
Original Filed Nov. 12, 1925 4 Sheets-Sheet 3
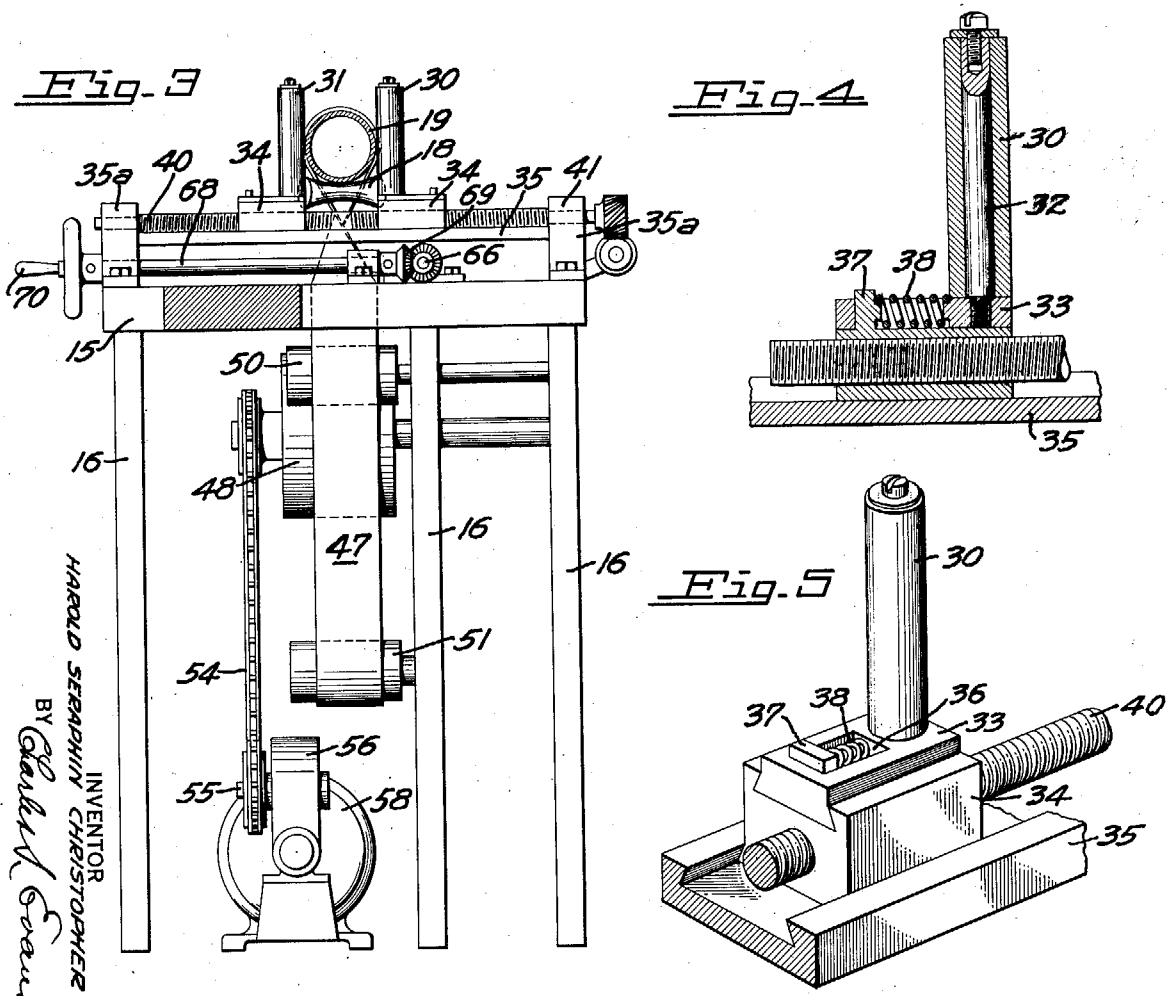
INVENTOR
HAROLD SERAPHIN CHRISTOPHER
BY Charles A. Evans
HIS ATTORNEY May 27, 1930. H. S. CHRISTOPHER Re. 17,675
MACHINE FOR TREATING PIPES AND THE LIKE
Original Filed Nov. 12, 1925 4 Sheets-Sheet 4
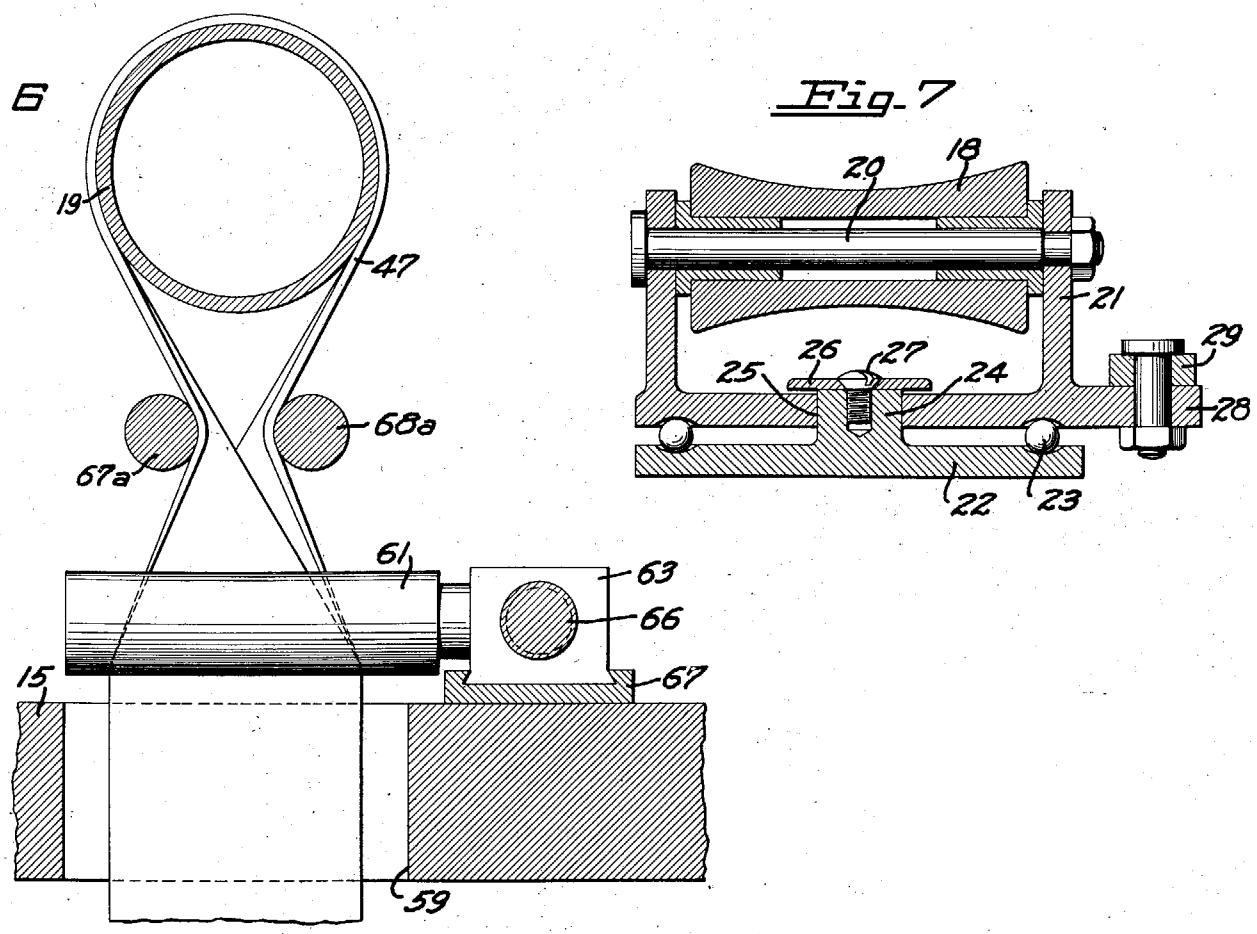
INVENTOR
HAROLD SERAPHIN CHRISTOPHER
BY Charles S. Evans
HIS ATTORNEY Reissued May 27, 1930 Re. 17,675

UNITED STATES PATENT OFFICE

HAROLD SERAPHIN CHRISTOPHER, OF LOS ANGELES, CALIFORNIA, ASSIGNOR, BY MESNE ASSIGNMENTS, TO THE PARAFFIN COMPANIES, INC., A CORPORATION OF DELAWARE

MACHINE FOR TREATING PIPES AND THE LIKE

Original No. 1,668,265, dated May 1, 1928, Serial No. 68,738, filed November 12, 1925. Application for reissue filed October 25, 1929. Serial No. 402,511.

My invention relates generally to machines for mechanically handling and surface treating elements of circular cross section, and particularly, although not necessarily, to machines for treating pipe.

It is a purpose of my invention to provide a machine operable to receive and continuously feed pipe therethrough and in such manner as to impart a helical motion to the pipe, whereby the surface treating of the pipe by the use of conventional devices can be automatically performed and with great facility and thoroughness.

It is also a purpose of my invention to provide a machine of the above described character which is adjustable to vary the angularity of the convolutions of the helical motion of the pipe to suit various conditions and devices for treating the pipe, the machine being further adjustable to accommodate pipes of different diameters.

A further purpose of my invention is the provision of a machine, particularly adapted for wrapping pipes with a protective covering.

I will describe only one form of the machine of my invention, and will then point out the novel features of my invention in claims.

In the accompanying drawings,

Figure 3 is a vertical sectional view taken on the line 3—3 of Figure 2;

Figure 4 is a fragmentary vertical sectional view of one of the vertical supporting rollers and its mounting embodied in the machine shown in the preceding views;

Figure 5 is a view showing in perspective one of the vertical supporting rollers and its mounting;

Figure 6 is an enlarged sectional view taken on the line 6—6 of Figure 2;

Figure 7 is an enlarged sectional view taken on the line 7—7 of Figure 1.

Similar reference characters refer to similar parts in each of the several views.

Figure 1:
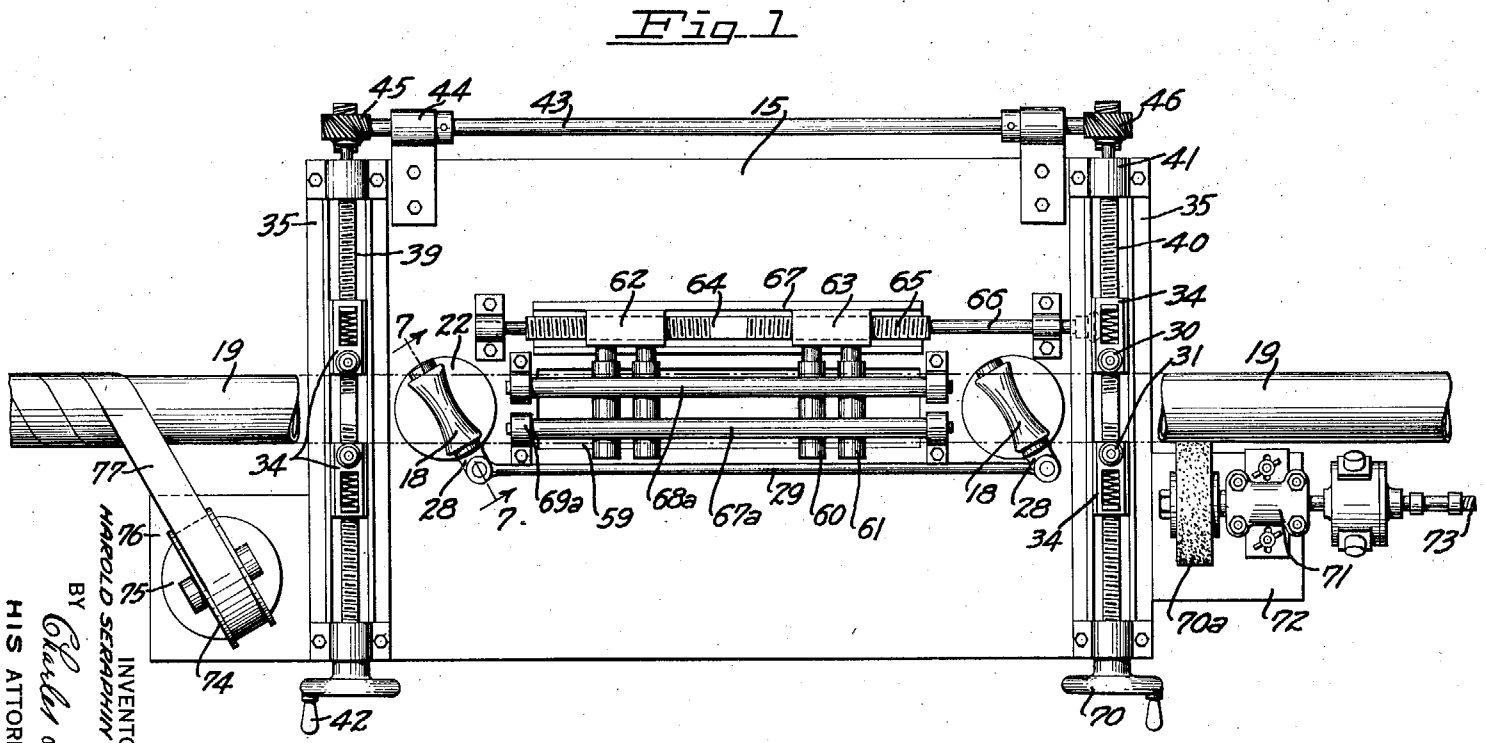
Figure 1 is a view showing in top plan one form of machine embodying my invention.

Referring specifically to the drawings, my invention, in its present embodiment, comprises a table, the top 15 of which is supported in elevation by means of legs 16 connected by a frame 17. On the top 15 are mounted a pair of concave rollers 18 arranged in spaced relation to each other, as shown in Figure 1, and rotatable about vertical axes to occupy various angular positions with respect to a length of pipe 19 supported thereon and extending longitudinally of the table top.

As illustrated to advantage in Figure 7, each roller 18 is journaled on an axle 20 secured in a U-shaped frame 21 supported for rotational movement on a base 22. Ball bearings 23 are interposed between the frame and the base, and the base is provided centrally with a projection 24 extending into an opening 25 of the base to center the frame on the base, a plate 26 being secured to the projection 24 by a screw 27 to confine the frame against displacement from the projection. By this arrangement, it will be clear that the roller 18 is free to rotate about the axle 20 as an axis, while the frame 21 is capable of rotation about the projection 24 as an axis to permit the roller to move bodily about an axis substantially perpendicular to that of the longitudinal axis of the pipe, so as to occupy various positions for a purpose to be described hereinafter.

It is desirable that the rollers 18 be operatively connected so that they will simultaneously occupy the same angular position with respect to the pipe 19, and to this end the frames 21 are provided with ears 28 to which are pivotally connected the opposite ends of a rod 29.

The rollers 18 serve to support the pipe 19 for longitudinal movement, and to confine the pipe on these rollers as the pipe is fed through the machine, two pairs of vertical rollers are provided at opposite ends of the table top. The rollers of each pair are designated 30 and 31, respectively, and as illustrated to advantage in Figures 4 and 5, each roller is confined but rotatable on an upright pintle 32 secured in a plate 33 having a mortise and tenon connection with a block 34, and the latter having a similar connection with a base 35 bolted or otherwise secured to the table top. The plate 33 is provided with an opening 36 in which works a projection 37 formed on the block 34 so as to allow of a limited longitudinal movement of the plate in the block.

A spring 38 is seated within the opening 36 between one wall of the latter and the projection 37, and in this manner the spring functions to normally urge the plate to a position in which the projection is disposed at one end of the opening. In this urged position of the plate, the roller 30 or 31 is yieldably urged toward the other roller, and with a pipe placed between the rollers and fed longitudinally therethrough, it will be manifest that because of the yielding mounting of the rollers they will yield to any surface imperfections of the pipe or any variance in diameter thereof, and yet properly function to confine the pipe on the concave rollers 18.

The rollers 30 and 31 of each pair can be adjusted to accommodate pipes of various diameters, and to this end the blocks 34 are capable of longitudinal adjustment in the bases 35 by means of screw threaded shafts 39 and 40, journaled in suitable bearings 41 formed in the supports 35ª. These shafts have threaded engagement with the blocks 34 so that by rotation of the shafts a feeding of the blocks longitudinally within the bases can be effected. It is to be noted, however, that each shaft 39 and 40 is provided with oppositely threaded portions, so that when either shaft is rotated the corresponding rollers 30 and 31 will be fed toward or away from each other to vary their spaced relation and to thereby accommodate pipes of different diameters.

Both shafts 39 and 40 can be simultaneously operated through the medium of a crank 42 fixed to one end of the shaft 39. The shaft 39, in turn, is operatively connected to a shaft 43 journaled in bearings 44, and miter gears 45 are secured to the adjacent ends of the two shafts to form the operative connection. The shaft 43 is operatively connected to one end of the shaft 40 through helical gears 46. Thus when the shaft 39 is rotated in one direction or the other, a corresponding rotation of the shaft 40 is likewise effected.

To feed the pipe 19 longitudinally on the supporting rollers, but to simultaneously impart a helicoidal movement to the pipe, so as to provide a combined rotary and longitudinal motion, I employ an endless belt 47 trained about a driving pulley 48 supported in a suitable hanger depending from the frame 17. The belt 47 is also trained about idle pulleys 49 and 50 on the frame 17, and a floating pulley 51 supported on an arm 52 pivoted as indicated at 53. The shaft for the pulley 48 has a chain-and-sprocket connection 54 with a shaft 55 of a reduction gearing 56 which is operatively connected to the shaft 57 of a motor 58.

Figure 2:
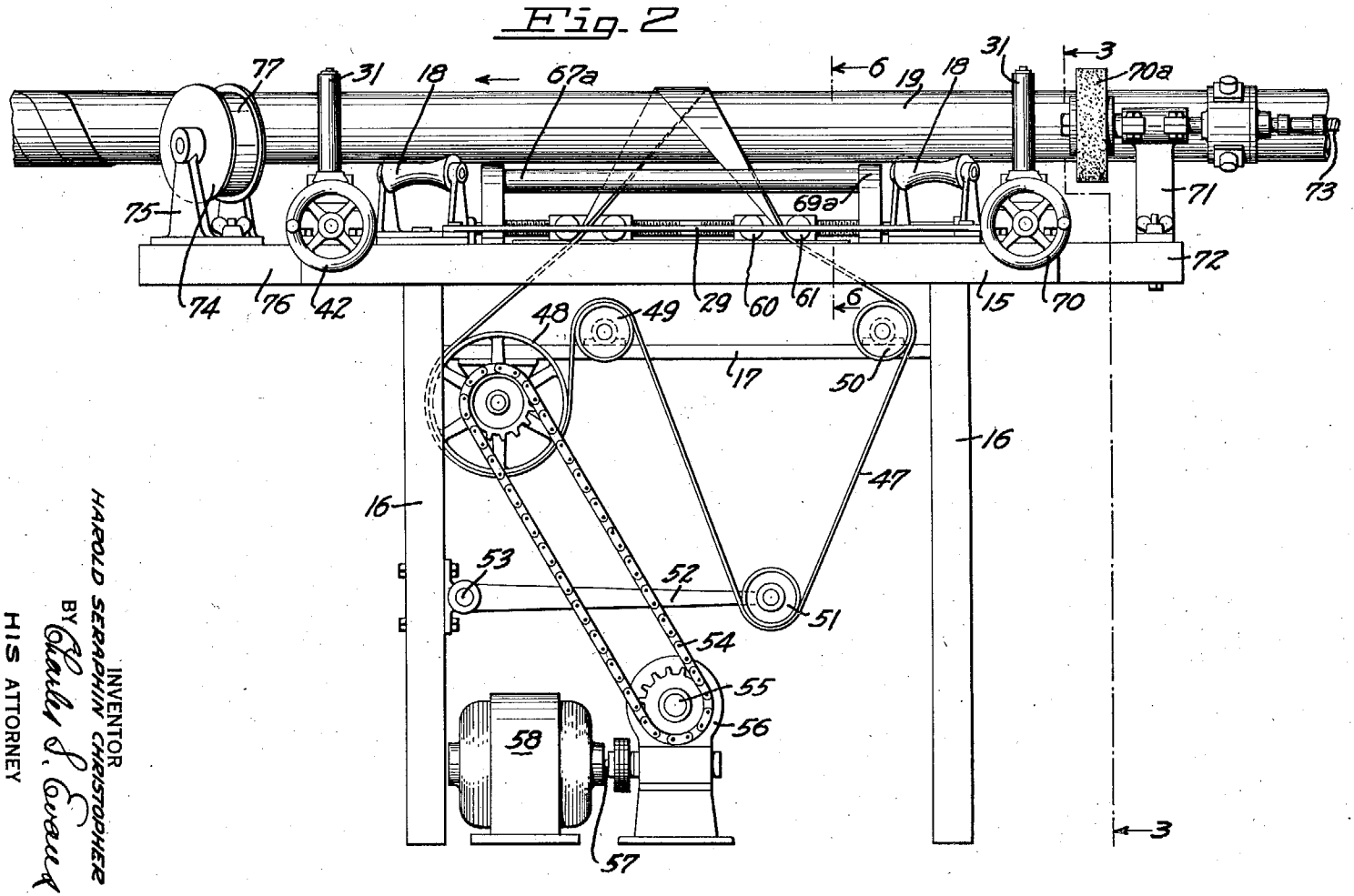
Figure 2 is a view showing the machine in side elevation.

As clearly shown in Figure 2, the belt 47 is extended above the several pulleys and through a suitable slot 59 in the table top 15, for helical training about the pipe 19 so as to tractionally engage the pipe. To effect such helical training two pairs of transverse guide rollers are provided, the rollers of each pair being designated 60 and 61. The two pairs of rollers are mounted on blocks 62 and 63, respectively, having screw threaded engagement with the oppositely threaded portions 64 and 65 of a shaft 66, the blocks in turn being slidable in a grooved base 67. The shaft 66 is adapted to be rotated manually through the medium of a shaft 68 (Figure 3) operatively connected with the shaft 66 by bevel gears 69. The shaft 68 extends to the forward side of the machine, where it is provided with a crank 70. By this arrangement of the guide rollers, it is apparent that they may be moved toward and away from each other and longitudinally of the pipe, to vary the length of the belt between the pipe and each guide roller, and thereby shift the belt angularly so as to determine the relationship between the longitudinal and the rotary motions of the pipe.

Operating in conjunction with the rollers 60 and 61 are a pair of longitudinally disposed rollers 67ª and 68ª mounted in bearings 69ª. These rollers 67ª and 68ª are disposed above the transverse rollers 60 and 61 and are arranged at right angles thereto. As shown in Figure 2, the two stretches of the belt 47 leading to or from the helical portion of the belt embracing the pipe 19 are extended between the two pairs of transverse rollers 60 and 61, and immediately above these rollers the stretches of the belt are twisted and extended between the longitudinal rollers 67ª and 68ª, with the latter functioning to maintain the twisted positions of the stretches, serving as a rolling support for the stretches, and because of their narrow spacing maintaining the helical looped portion of the belt in firm driving engagement with the pipe 19.

In the present embodiment of my invention, I have shown a rotary brush 70ª rotatably mounted on a support 71 secured to an extension 72 of the table top 15, the brush being driven by a flexible shaft 73 connected to any suitable source of power (not shown). This brush 70ª is mounted to have brushing contact with the surface of the pipe 19 as the latter is fed through the machine, thereby effecting a cleaning of the surface preparatory to the coating of the pipe.

In the present instance, I have shown a wrapping device which is in the form of a reel 74 rotatable in a support 75 secured to an extension 76 of the table top 15. On the reel 74 is wound a suitable tape 77 for covering the pipes to protect the latter against corrosion, and the reel is so mounted as to feed the tape and helically wrap the same on the pipe as the latter is fed through the machine; the spiral of the tape on the pipe being a function of the relationship between the longitudinal and the rotary motions of the pipe.

The operation of the machine is as follows: With current supplied to the motor 58, the driving pulley 48 will be constantly driven in one direction with the latter, in turn, operating to continuously drive the endless belt 47, and under the guidance of the rollers 60, 61, 67[a] and 68[a]; that portion of the belt engaging the pipe 19 being arranged helically thereon and having driving engagement therewith, will operate to simultaneously rotate and feed the pipe 19 longitudinally in the direction of the arrow in Figure 2, thereby imparting helical movement to the pipe.

Under this feeding movement of the pipe, the brush 70[a] will, while rotating, operate to engage and clean every portion of the surface of the pipe, and following this cleaning operation, the tape feeding device after initially wrapping the end of the tape on the pipe will function under the helical movement of the latter to spirally wrap the pipe with the tape. It will, of course, be understood that other coating devices may be used, but the present device is thought to be sufficient to demonstrate that the helical motion of the pipe may be employed to coat the pipe with a solid or a liquid.

The pipe 19 in its helical movement through the machine is guided effectively by the vertical rollers 30 and 31, and through the adjusting means for these rollers it will be understood that they can be spaced any distance to accommodate pipes of greater or less diameter. The pipe is supported in its longitudinal movement by means of the rollers 18 and should the helical motion of the pipe be increased or decreased with respect to the angularity of its convolutions, it will be understood that by virtue of the mounting of the rollers 18 they will automatically conform to any variance in such movement, so that they may continue to properly support the pipe and yet not interfere with its helical motion.

Should it be desired to increase or decrease the included angle between the stretches of the helical portion of the belt 47 so as to increase or decrease the angularity of the convolutions which the pipe describes, the rollers 60 and 61 can be readily adjusted to vary their spaced relation and thereby move the two stretches of the belt toward or away from each other, which will, of necessity, increase or decrease the helical motion of the pipe. This adjustment of the belt is permitted by virtue of the mounting of the floating pulley 51, as it will be understood that the arm 52 will permit the pulley to move vertically to permit the belt to compensate for any adjustment of its helical portion. It will be noted that the mounting of the pulley 51 also serves to maintain the belt 47 under proper tension, irrespective of the position of the pulley, so that the belt will be held taut and have proper driving engagement with the other pulleys and the pipe. Also, due to the position of the belt, rollers, and the provision of the belt tensioning means, it is apparent that the belt will hold the pipe tightly on its supporting means to prevent wobbling of the pipe.

Although I have herein shown and described only one form of machine embodying my invention, it is to be understood that various changes and modifications may be made therein without departing from the spirit of the invention and the spirit and scope of the appended claims.

I claim as my invention:

1. A machine of the character described comprising means for supporting a pipe for movement, an endless belt adapted to be trained around the pipe, rollers by which the belt is held in helical position on the pipe so that when the latter is driven it will operate to drive the pipe spirally in one direction, and means for adjusting the rollers whereby the helical position can be varied to increase or decrease the included angle of the helical motion of the pipe.

2. A machine of the character described comprising spaced concave rollers mounted for rotational movement and operatively connected to occupy corresponding positions, said rollers being adapted to support a pipe thereon, vertically disposed rollers arranged in pairs at the outer sides of the first rollers with the rollers of each pair spaced to accommodate the pipe therebetween supported on the first rollers, and means adapted to impart helical movement to the pipe.

3. A machine as embodied in claim 2 wherein the vertically disposed rollers are adjustable to accommodate pipes of different diameters.

4. A machine as embodied in claim 2 wherein the vertically disposed rollers are yieldably supported in the manner and for the purpose described.

5. A machine of the character described comprising means for supporting a pipe for rotary and longitudinal movements, and means for feeding the pipe along the supporting means in a manner to effect helical motion of the pipe, the first means including rollers supporting the pipe and freely movably bodily and about their own axes in response to the helical feeding motion of the pipe.

6. In a machine of the character described, pipe supporting rollers horizontally disposed and mounted to rotate bodily about vertical axes in response to helical movement of a pipe so that the rollers will have rolling contact with the pipe regardless of the longitudinal feed of the latter, and means for operatively connecting the rollers so that they occupy corresponding positions.

7. In a machine of the character described, pipe supporting concave rollers horizontally disposed and mounted to rotate bodily about vertical axes in response to helical movement of a pipe so that the rollers will have rolling contact with the pipe regardless of the longitudinal feed of the latter, and means for operatively connecting the rollers so that they occupy corresponding positions.

8. In a machine of the character described, transverse rollers arranged in pairs, longitudinal rollers above and at right angles to the transverse rollers, means above the longitudinal rollers for supporting a pipe for lengthwise movement longitudinally of the rollers, a belt trained between the transverse and longitudinal rollers and over said pipe whereby the belt is caused to have spiral engagement with the pipe, and means for driving the belt to effect spiral rotation of the pipe.

9. A machine as embodied in claim 8, wherein the transverse rollers are adjustable in pairs to vary the spiral position of the belt and to thereby increase or decrease the included angle of the spiral motion of the pipe.

10. In a machine of the character described, transverse rollers arranged in pairs and adjustable with respect to each other to vary their spaced relation, longitudinal rollers above and at right angles to the transverse rollers, vertical rollers arranged in pairs at opposite ends of the longitudinal rollers and adjustable transversely of the latter, concave rollers interposed between the longitudinal rollers and the vertical rollers and operatively connected to occupy corresponding positions, a belt trained between the transverse and longitudinal rollers and over a pipe adapted to be supported on the concave rollers and moving between the vertical rollers whereby the belt is caused to have spiral engagement with the pipe, and means for driving the belt to effect spiral rotation of the pipe.

11. A machine of the character described comprising means for supporting for movement a cylindrically shaped object, an endless belt adapted to tractionally engage the object to impart thereto a combined rotary and longitudinal motion upon movement of the belt, and means for shifting said belt to vary the relationship between the longitudinal and the rotary motions.

12. A machine of the character described comprising means for supporting for movement a cylindrically shaped object, an endless belt adapted to tractionally engage the object to impart thereto a combined rotary and longitudinal motion upon movement of the belt, and adjustably mounted guide means contacting with said belt to vary the relationship between the longitudinal and the rotary motions.

13. A machine of the character described comprising means for supporting for movement a cylindrically shaped object, an endless belt adapted to tractionally engage the object to impart thereto a combined rotary and longitudinal motion upon movement of the belt, and an adjustably mounted guide roller contacting with said belt to vary the relationship between the longitudinal and the rotary motions.

14. A machine of the character described comprising means for supporting for movement a cylindrically shaped object, an endless belt adapted to tractionally engage the object to impart thereto a combined rotary and longitudinal motion upon movement of the belt, and adjustably mounted guide means contacting with said belt and movable to vary the length of belt between it and the object.

15. A machine of the character described comprising means for supporting for movement a cylindrically shaped object, an endless belt adapted to tractionally engage the object to impart thereto a combined rotary and longitudinal motion upon movement of the belt, adjustably mounted guide means contacting with said belt and movable to vary the length of belt between it and the object, and means for moving said guide means.

16. A machine of the character described comprising means for supporting for movement a cylindrically shaped object, an endless belt adapted to tractionally engage the object to impart thereto a combined rotary and longitudinal motion upon movement of the belt, adjustably mounted guide means contacting with said belt and movable to vary the length of belt between it and the object, and tensioning means contacting with said belt for holding the belt taut on the object.

17. A machine of the character described comprising means for supporting for movement a cylindrically shaped object, an endless belt adapted to tractionally engage the object to impart thereto a combined rotary and longitudinal motion upon movement of the belt, and an adjustably mounted guide roller positioned with its axis substantially transverse with respect to the longitudinal axis of the object, said roller being movable longitudinally of the object to vary the length of belt between it and the object.

18. A machine of the character described comprising means for supporting for movement a cylindrically shaped object, an endless belt adapted to tractionally engage the object to impart thereto a combined rotary and longitudinal motion upon movement of the belt, and a pair of guide elements contacting with said belt, one of said guide elements being mounted for movement relative to the other to vary the relationship between the longitudinal and the rotary motions.

19. A machine of the character described comprising means for supporting for movement a cylindrically shaped object, an endless belt adapted to tractionally engage the object to impart thereto a combined rotary and longitudinal motion upon movement of the belt, a pair of guide elements contacting with said belt, one of said guide elements being mounted for movement relative to the other to vary the relationship between the longitudinal and the rotary motions, and tensioning means contacting with said belt for holding the belt taut on the object.

20. A machine of the character described comprising means for supporting for movement a cylindrically shaped object, an endless belt adapted to tractionally engage the object to impart thereto a combined rotary and longitudinal motion upon movement of the belt, a pair of guide elements contacting with said belt, one of said guide elements being mounted for movement relative to the other to vary the relationship between the longitudinal and the rotary motions, and means for moving said movable guide element.

21. A machine of the character described comprising means for moving a cylindrically shaped object with a combined rotary and longitudinal motion, rollers for supporting said object, and mounting means for said rollers to allow free bodily movement thereof about axes substantially perpendicular to the axes of the rollers.

22. A machine of the character described comprising means for supporting for movement a cylindrically shaped object, an endless belt adapted to tractionally engage the object to impart thereto a combined rotary and longitudinal motion upon movement of the belt, a guide element contacting with said belt and arranged substantially transversely of the object to provide a twist in the belt, and a second guide element arranged substantially transversely of the first guide element for maintaining the twisted portion of the belt in firm engagement with the object.

23. A machine of the character described comprising means for supporting for movement a cylindrically shaped object, an endless belt adapted to tractionally engage the object to impart thereto a combined rotary and longitudinal motion upon movement of the belt, an adjustably mounted guide element contacting with said belt and arranged substantially transversely of the object to provide a twist in the belt, said guide element being movable to vary the length of belt between it and the object, and a second guide element arranged substantially transversely of the first guide element for maintaining the twisted portion of the belt in firm engagement with the object.

24. A pipe wrapping machine comprising means for supporting the pipe, an endless belt adapted to tractionally engage the pipe and hold it tightly against the supporting means, means for driving said belt to impart to the pipe a combined rotary and longitudinal motion, means for shifting said belt to vary the relationship between the longitudinal and the rotary motions, and means for applying tension on said belt to hold it taut regardless of the position thereof.

25. A pipe wrapping machine comprising freely journaled rollers for supporting the pipe, mounting means for said rollers to allow bodily movement thereof about axes substantially perpendicular to the axes of the rollers, and means for allowing and effecting movement of the pipe with a combined rotary and longitudinal motion.

26. A pipe wrapping machine comprising means for imparting a combined rotary and longitudinal motion to the pipe, and supporting rollers for the pipe journaled for free rotation and mounted for adjustment about axes substantially perpendicular to the axis of the pipe.

27. A pipe wrapping machine comprising means for imparting a combined rotary and longitudinal motion to the pipe, rollers on which the pipe rests and journaled to be rotated by and with the pipe, and a mounting for each roller to allow adjustment about an axis substantially perpendicular to the axis of the pipe.

In testimony whereof, I have hereunto set my hand this 16th day of October, 1929.

HAROLD SERAPHIN CHRISTOPHER.

CERTIFICATE OF CORRECTION.

Reissue Patent No. 17,675. Granted May 27, 1930, to

HAROLD SERAPHIN CHRISTOPHER.

It is hereby certified that the name of the assignee in the above numbered patent was erroneously written and printed as "The Paraffin Companies, Inc.", whereas said name should have been written and printed as "The Paraffine Companies, Inc.", as shown by the records of assignments in this office; and that the said Letters Patent should be read with this correction therein that the same may conform to the record of the case in the Patent Office.

Signed and sealed this 29th day of July, A. D. 1930.

Wm. A. Kinnan,
Acting Commissioner of Patents.

(Seal)